(12) United States Patent
Oi et al.

(10) Patent No.: US 12,113,945 B2
(45) Date of Patent: Oct. 8, 2024

(54) RECORDING DEVICE HAVING PLACING TRAY WITH INTEGRATED LIGHT SOURCE

(71) Applicant: SEIKO EPSON CORPORATION, Tokyo (JP)

(72) Inventors: Tomoyuki Oi, Matsumoto (JP); Yusuke Kato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/192,574

(22) Filed: Mar. 29, 2023

(65) Prior Publication Data

US 2023/0319203 A1 Oct. 5, 2023

(30) Foreign Application Priority Data

Mar. 30, 2022 (JP) ................................. 2022-055309

(51) Int. Cl.
*H04N 1/00* (2006.01)
*G06K 15/02* (2006.01)

(52) U.S. Cl.
CPC ........... *H04N 1/0066* (2013.01); *G06K 15/02* (2013.01); *G06K 15/021* (2013.01); *H04N 1/00663* (2013.01); *H04N 1/00724* (2013.01)

(58) Field of Classification Search
USPC ........................................................ 358/1.6
See application file for complete search history.

(56) References Cited

U.S. PATENT DOCUMENTS

| | | | | |
|---|---|---|---|---|
| 2005/0081727 | A1* | 4/2005 | Goss | ....................... B41F 15/12 101/128.4 |
| 2006/0214971 | A1* | 9/2006 | Yamazaki | ............ H04N 1/4015 347/15 |
| 2012/0155896 | A1* | 6/2012 | Shibuya | ............. G03G 21/1671 399/50 |
| 2016/0292546 | A1* | 10/2016 | Yamashita | ......... G06K 15/1843 |
| 2016/0307078 | A1* | 10/2016 | Akazawa | ........... G06K 15/1823 |

FOREIGN PATENT DOCUMENTS

JP 2019-131909 A 8/2019

* cited by examiner

*Primary Examiner* — Jacky X Zheng
(74) *Attorney, Agent, or Firm* — WORKMAN NYDEGGER

(57) ABSTRACT

A recording device includes a recording head configured to perform recording on a T-shirt, a tray including a placing surface for placement of the T-shirt, the tray being configured to move in a front-rear direction including a position facing the recording head, an illumination mechanism configured to emit light in an illumination pattern toward the placing surface from a lower side of the placing surface, an operation panel configured to receive illumination instruction information specifying the illumination pattern, and a control unit. The control unit is configured to change the illumination pattern of the illumination mechanism, based on the illumination instruction information received by the operation panel.

11 Claims, 9 Drawing Sheets

RECORDING DEVICE HAVING PLACING TRAY WITH INTEGRATED LIGHT SOURCE

The present application is based on, and claims priority from JP Application Ser. No. 2022-055309, filed Mar. 30, 2022, the disclosure of which is hereby incorporated by reference herein in its entirety.

BACKGROUND

1. Technical Field

The present disclosure relates to a recording device, a control method for the recording device, and a recording system.

2. Related Art

In the related art, recording devices for printing patterns and the like on fabrics such as T-shirts have been known. Some recording devices perform unique printing one by one in accordance with customer's requests at a store or the like. For example, JP-A-2019-131909 discloses a method of setting fabrics to a printing device as the recording device as described above. This method includes a step of marking at four locations in the fabric, and a step of setting at a platen with the marks of the four locations of the fabric aligned with the light emission position of a light emission means.

However, with the method disclosed in JP-A-2019-131909, it is difficult to perform printing of patterns and the like aligned with the position intended by the operator. Specifically, in the above-described recording device, in some situation printing patterns and positions and the like are instructed from an information terminal such as a personal computer. At this time, the printing position displayed at the information terminal, and the position to be marked, i.e., the position where patterns and the like are to be printed, may not match in some situation. In particular, in the case of soft and variously-sized media such as T-shirts, it is difficult to align the position to be marked with the desired printing position in the up-down direction of the medium, i.e., the front-rear direction of the recording device. Consequently, the desired printing position and the actual printing position may be shifted from each other while it is easy to align the marked position with the printing position.

In addition, there is a method of projecting print images displayed on an information terminal to an actual medium using a projector and the like. With this method, the device has to be large and expensive while it is easy to align the desired printing position with the actual printing position. It is difficult for this method to install the device in stores and the like, which is disadvantageous from the standpoint of dissemination of the device. From the above, a recording device that can place a medium such as T-shirts at an appropriate position with a simple configuration is desired.

SUMMARY

A recording device includes a recording unit configured to perform recording on a medium, a placing part including a placing surface for placement of the medium, the placing part being configured to move in a front-rear direction including a position facing the recording unit, an illumination mechanism configured to emit light in an illumination pattern toward the placing surface from a lower side of the placing surface, an input unit configured to receive illumination instruction information specifying the illumination pattern, and a control unit. The control unit is configured to change the illumination pattern of the illumination mechanism, based on the illumination instruction information received by the input unit.

A control method for a recording device, the recording device includes a recording unit configured to perform recording on a medium, a placing part including a placing surface for placement of the medium, the placing part being configured to move in a front-rear direction including a position facing the recording unit, an illumination mechanism configured to emit light in an illumination pattern toward the placing surface from a lower side of the placing surface, and an input unit configured to receive illumination instruction information specifying the illumination pattern. The illumination pattern of the illumination mechanism is configured to be changed based on the illumination instruction information received by the input unit.

A recording system includes a recording device, a host device, a recording unit configured to perform recording on a medium, a placing part including a placing surface for placement of the medium, the placing part being configured to move in a front-rear direction including a position facing the recording unit, an illumination mechanism configured to emit light in an illumination pattern toward the placing surface from a lower side of the placing surface, and a reception unit configured to receive an illumination instruction information specifying the illumination pattern from the host device, and a recording side control unit. The host device includes a transmission unit, and a host side control unit, the host side control unit transmits the illumination instruction information to the recording device by using the transmission unit, and the illumination pattern of the illumination mechanism is configured to be changed by the recording side control unit, based on the illumination instruction information received by the reception unit.

DESCRIPTION OF EXEMPLARY EMBODIMENTS

In this embodiment, an example of a recording device 1 that performs printing of a pattern and the like in a unique manner one by one on a medium such as T-shirt is described.

The recording device 1 is an ink-jet printer. The recording device 1, a control method for the recording device 1, and a recording system including the recording device 1 according to this embodiment are described below with reference to the accompanying drawings.

The drawings described below are illustrated with XYZ axes as coordinate axes orthogonal to one another as necessary. The direction pointed with each arrow is the + direction, and the direction opposite to the + direction is the − direction. The Y axis is along the front-rear direction of the recording device 1, and the +Y direction of the recording device 1 is the front side. The X axis is along the left-right direction of the recording device 1, and the +X direction of the recording device 1 is the left side. The Z axis is a virtual axis along the vertical direction. The +Z direction is the upper side, and the −Z direction is the lower side in the recording device 1. The direction along the X axis is the left-right direction, the direction along the Y axis is the front-rear direction, and the direction along the Z axis is the up-down direction.

Figure 1:
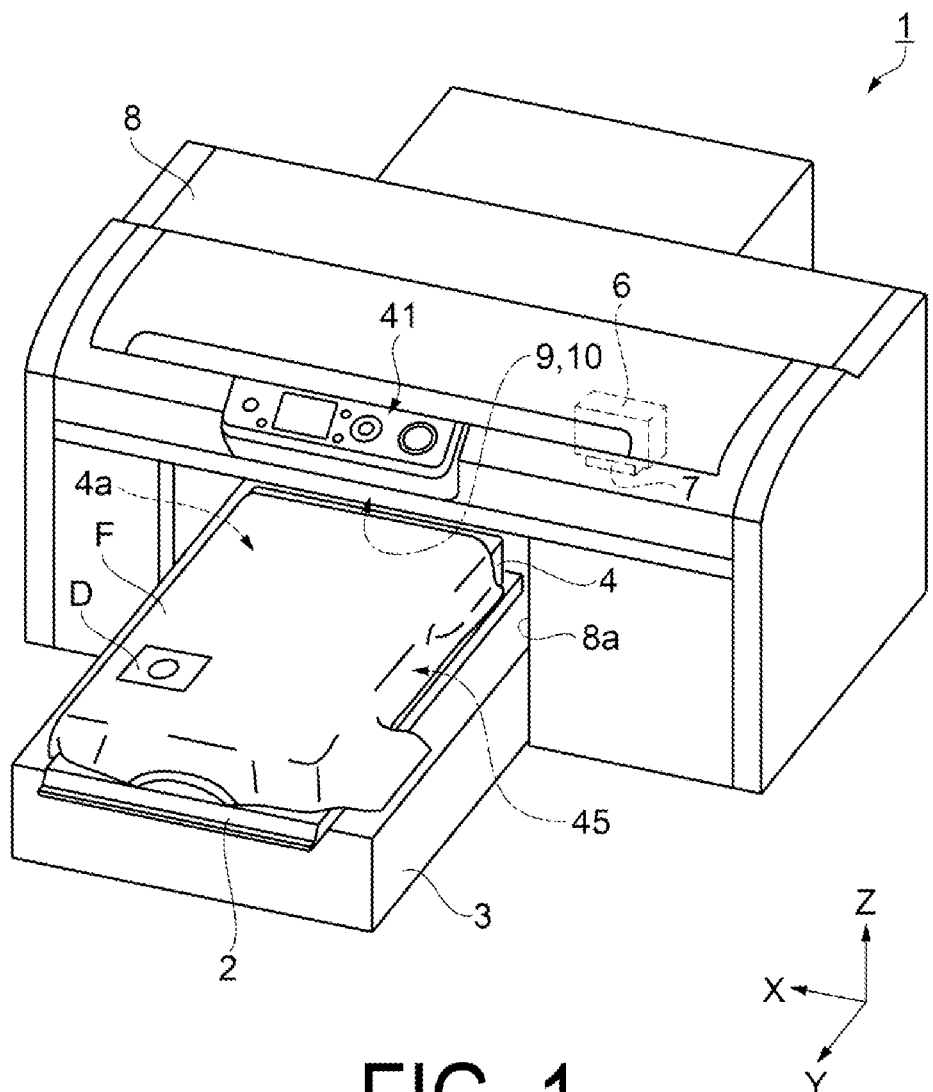
FIG. 1 is a perspective view illustrating a configuration of a recording device according to an embodiment.

As illustrated in FIG. 1, the recording device 1 includes an exterior member 8, a recording head 7 serving as a recording unit, a tray 4 serving as a placing part, an illumination mechanism 45, an operation panel 41 serving as an input unit, and a medium conveyance unit 3, a colorimeter mechanism 9, and an illuminometer mechanism 10. In addition, although not illustrated in the drawing, the recording device 1 includes a control unit 25 and a reception unit 35a serving as another input unit described later inside the exterior member 8. FIG. 1 illustrates a state where a T-shirt F, which is a medium, is placed on a placing surface 4a of the tray 4. At the chest part of the T-shirt F, a pattern D has been printed with the recording device 1. Note that FIG. 1 illustrates the tray 4 located at a position where the T-shirt F can be placed and taken out.

The exterior member 8 is a housing with a substantially cuboid shape, and houses the recording head 7, a carriage 6, and other various components inside. The operation panel 41 is disposed on the front and upper sides of the exterior member 8.

For operations of the recording device 1, the operation panel 41 has a display function for displaying a variety of information and an input function for receiving various instructions and the like corresponding to operational conditions and the like. The operation panel 41 includes a liquid crystal display device of a touch-panel type, for example. The operation panel 41 includes the control unit 25. The operation panel 41 may be provided with various buttons separately from the above-described liquid crystal display device. Note that the various instructions related to the operation of the recording device 1 may be inputted to the recording device 1 through an information terminal such as a personal computer, for example.

The recording head 7 is disposed below the carriage 6. The recording head 7 performs recording, i.e., printing, on the T-shirt F. Although not illustrated in the drawing, the recording head 7 includes a nozzle surface at a position facing downward. The nozzle surface faces a platen in the up-down direction when printing is performed by the recording device 1. A plurality of nozzle rows are disposed in the nozzle surface.

Each of the plurality of nozzle rows is composed of a plurality of nozzles, and individually ejects inks of colors such as cyan, magenta, yellow and black, for example. These inks are supplied to the recording head 7 through a pipe from an ink container (not illustrated in the drawing) housed in the exterior member 8. The ink ejected from the recording head 7 may be a clear ink and processing liquid as well as the above-described color inks.

The recording head 7 uses a piezoelectric element as an actuator that is a driving means for ink ejection. The driving means is not limited to this. The driving means may be an electromechanical conversion element that displaces a diaphragm serving as an actuator through electrostatic attraction, or an electrothermal conversion element that ejects inks by bubbles resulting from heating, for example.

Although not illustrated in the drawing, the carriage 6 is connected to a synchronous belt, and the synchronous belt is driven by a carriage motor 32 described later. The synchronous belt moves the carriage 6 in the left-right direction, which is the main scanning direction, through the driving of the carriage motor 32. In this manner, the recording head 7 moves back and forth in the left-right direction while facing the platen in the up-down direction.

The medium conveyance unit 3 is disposed to protrude to the front side from an opening 8a of the exterior member 8 on the lower side of the surface facing the front side of the exterior member 8. A medium support unit 2 is disposed on the upper side of the medium conveyance unit 3. Further, the tray 4 is supported by the medium support unit 2 on the upper side of the medium support unit 2.

Although not illustrated in the drawing, the medium conveyance unit 3 moves the medium support unit 2 and the tray 4 in the front-rear direction through the driving of a conveyance motor 33 described later. In other words, the tray 4 can be moved by the medium conveyance unit 3 in the front-rear direction including a position facing the recording head 7.

The above-described platen is a region facing the recording head 7 at the placing surface 4a when printing is performed by the recording device 1. That is, printing is performed on the T-shirt F placed on the tray 4 at the platen. Specifically, the printing is performed at a position where the tray 4 and the medium support unit 2 are retracted from the position illustrated in FIG. 1.

At this time, the tray 4 and the medium support unit 2 can be retracted to a position protruded rearward from the surface facing the rear side of the exterior member 8. Thus, the printing can be performed to the region around the end portion of the tray 4 in the +Y direction on the T-shirt F placed on the tray 4.

The pattern D and the like are printed on the T-shirt F by ejecting ink from the recording head 7 at a predetermined timing while linking the movement of the tray 4 in the front-rear direction and the back-and-forth movement of the carriage 6 in the left-right direction.

Figure 2:
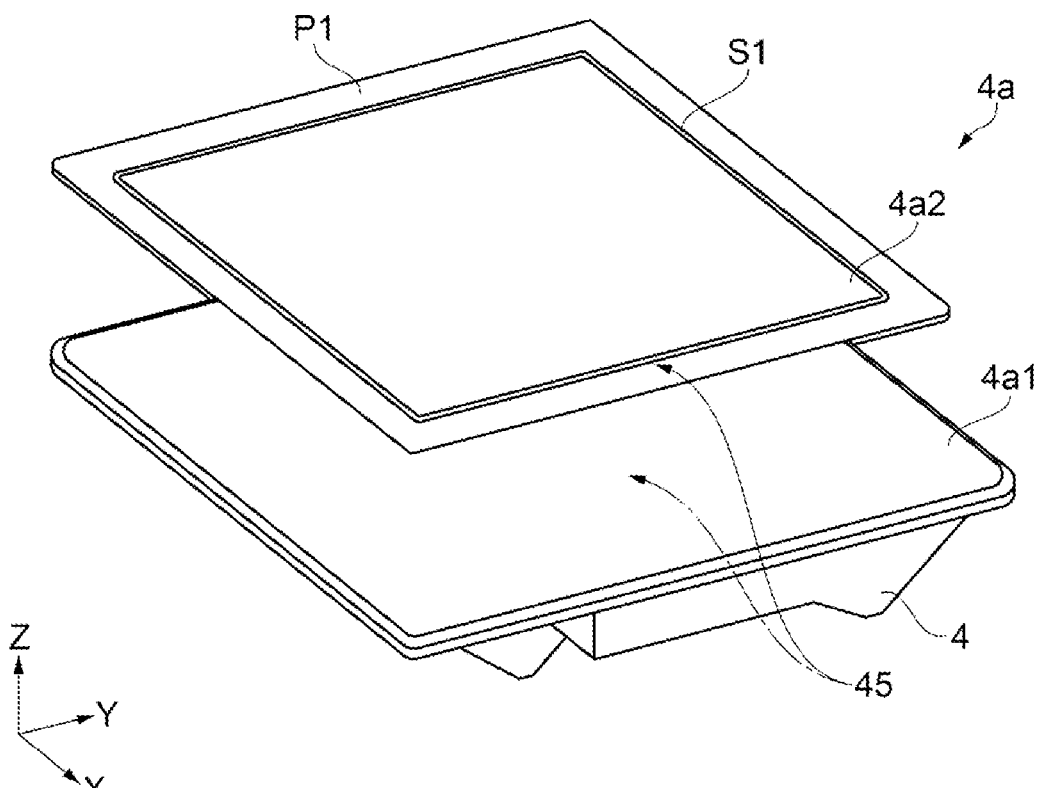
FIG. 2 is a perspective view illustrating a configuration of a tray and an illumination mechanism.

As illustrated in FIG. 2, the tray 4 is a member with a plate-like shape. A light shielding plate P1 can be attached to and detached from a placing surface 4a1 of the tray 4. FIG. 2 illustrates a state where the light shielding plate P1 is separated from the placing surface 4a1 for the sake of description of the configuration.

The tray 4 includes the placing surface 4a1 and a placing surface 4a2 as the placing surface 4a facing upward. The placing surface 4a1 is disposed at the tray 4, and the placing surface 4a2 is disposed at the light shielding plate P1 described later. The placing surfaces 4a1 and 4a2 extend along the XY plane. The T-shirt F is placed on the upper side of the placing surfaces 4a1 and 4a2.

The illumination mechanism 45 is disposed at the tray 4. The illumination mechanism 45 includes the light shielding plate P1 and a light source (not illustrated in the drawing) provided inside the tray 4. The light source of the illumination mechanism 45 emits light toward the placing surface 4a from the lower side of the placing surface 4a in an illumination pattern L1 described later. The light source of the illumination mechanism 45 illuminates the entire surface of the placing surface 4a1. The light quantity of the illumination pattern L1 of the light source of the illumination mechanism 45 is variable. Examples of the above-described light source include a light-emitting diode, a semiconductor laser, an organic EL (electroluminescence), and a halogen electric light bulb.

The light shielding plate P1 is a plate-shaped member. The main surface facing upward in the light shielding plate P1 is the placing surface 4a2. When the light shielding plate P1 is attached to the placing surface 4a1, the light shielding plate P1 is integrated with the tray 4. When the light shielding plate P1 is mounted to the tray 4, the T-shirt F is placed on the upper side of the placing surface 4a1 and the placing surface 4a2.

The light shielding plate P1 blocks a part of light emitted by the light source of the illumination mechanism 45, and illuminates the T-shirt F placed on the placing surface 4a2 in a manner corresponding to the illumination pattern L1. Specifically, the light shielding plate P1 includes a slit S1. In the light shielding plate P1, the region of the slit S1 transmits the light, and the region other than the slit S1 does not transmit the light. Thus, the light shielding plate P1 blocks a part of the light of the illumination mechanism 45 illuminating the placing surface 4a1 while transmitting the light only in the region of the slit S1.

In this manner, in top plan view, the region of the slit S1 emits light as the illumination pattern L1. The slit S1 has a frame-like shape. Thus, the illumination pattern L1 illuminates the T-shirt F placed on the placing surface 4a2 in a frame-like shape from below.

The recording device 1 may be configured to emit light in the illumination pattern L1 without using the light shielding plate P1. More specifically, the illumination mechanism 45 may be configured to emit only a specific region such as the illumination pattern L1 without having the light shielding plate P1. Examples of the illumination mechanism 45 with such a configuration include a liquid crystal panel, an organic EL panel, and a plurality of light-emitting diodes disposed in a matrix. In the case where the light shielding plate P1 is not used, the T-shirt F is directly placed on the placing surface 4a1. Note that while the illumination mechanism 45 is disposed at the tray 4 in the recording device 1, this configuration is not limitative.

Figure 3:
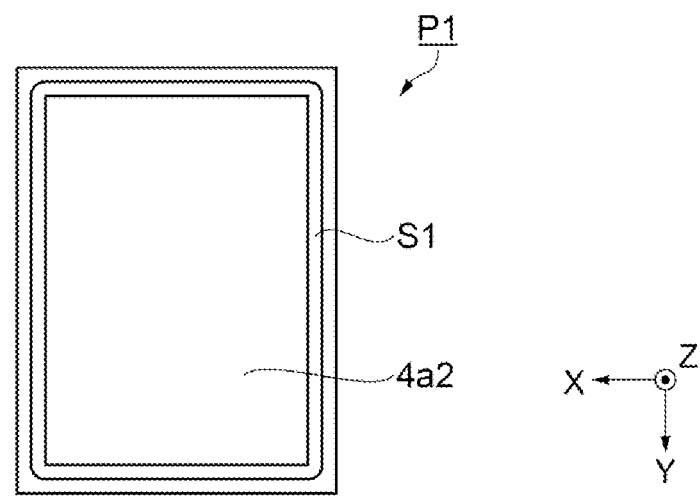
FIG. 3 is a plan view illustrating a configuration of a light shielding plate.

As illustrated in FIG. 3, the light shielding plate P1 has a substantially rectangular shape in top plan view. The slit S1 is provided along the outer periphery of the light shielding plate P1. The slit S1 represents the outer periphery of the printing range of the T-shirt F in the recording device 1. The printing range is a maximum range where the pattern D and the like can be printed on the T-shirt F. The above-described illumination pattern L1 corresponds to the shape of the slit S1 and represents the outer periphery of the printing range. Note that the shape with which the illumination mechanism 45 illuminates the T-shirt F is not limited to the illumination pattern L1 of the frame-like shape.

Figure 4:
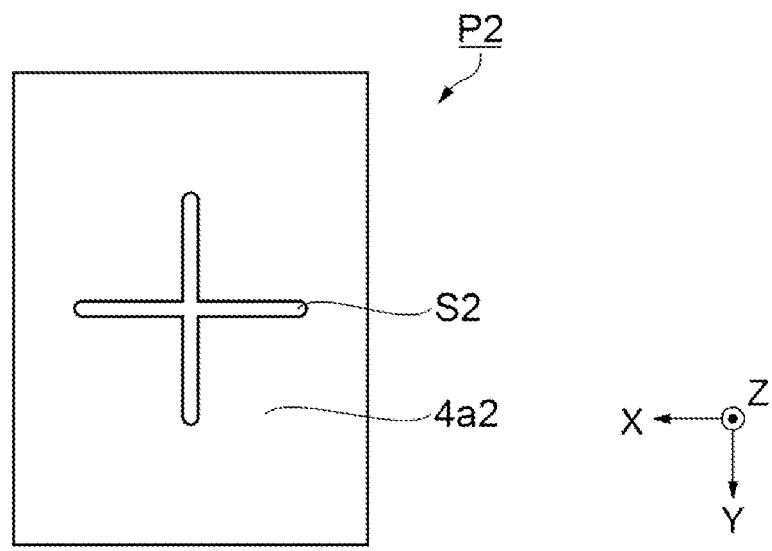
FIG. 4 is a plan view illustrating a configuration of the light shielding plate.

A light shielding plate P2 illustrated in FIG. 4 may be used instead of the light shielding plate P1. The outer periphery shape of the light shielding plate P2 in top plan view is the same as that of the light shielding plate P1. The light shielding plate P2 includes a slit S2. The slit S2 has a + shape with the line segment along the X axis and the line segment along the Y axis intersecting each other. The position of the intersection of the two line segments corresponds to the center of the above-described printing range. That is, the illumination pattern of the slit S2 corresponds to the slit S2, and represents the center position of the printing range. In addition, the light shielding plate P2 may include the slit S1 of the light shielding plate P1.

Figure 5:
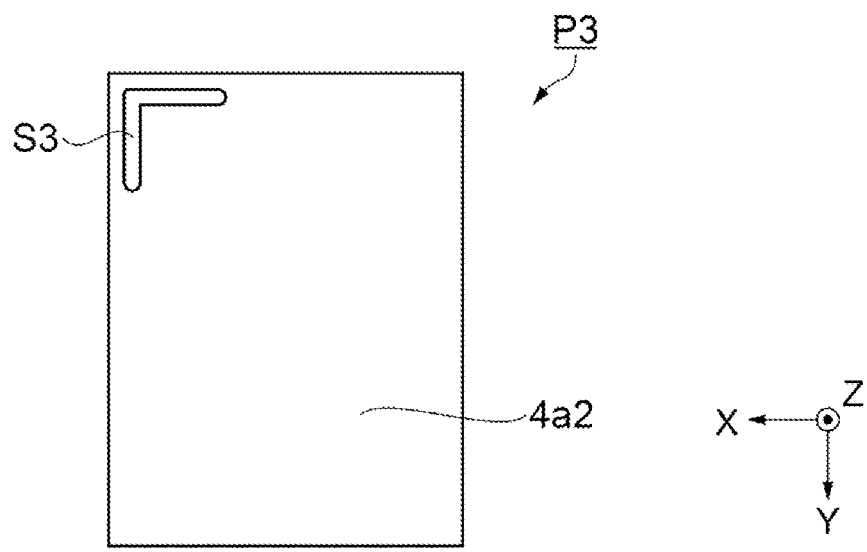
FIG. 5 is a plan view illustrating a configuration of the light shielding plate.

A light shielding plate P3 illustrated in FIG. 5 may be used instead of the light shielding plate P1. The outer periphery shape of the light shielding plate P3 in top plan view is the same as that of the light shielding plate P1. The light shielding plate P3 includes a slit S3. The slit S3 has a shape with the line segment along the X axis and the line segment along the Y axis intersecting each other at a position corresponding to a corner of the outer edge. The position of the intersection of the two line segments corresponds to any corner position of the above-described outer periphery of the printing range. That is, the illumination pattern of the slit S3 corresponds to the slit S3, and represents any corner position of the outer periphery of the printing range. Note that while the slit S3 corresponds to the corner position in the +X direction and the −Y direction at the outer periphery of the printing range, this corner position is not limitative. In addition, the light shielding plate P3 may include the slit S2 of the light shielding plate P2.

In the following description, the illumination pattern L1, an illumination pattern using the slit S2, an illumination pattern using the slit S3 and the like may be referred to simply as illumination pattern L as a collective term.

The light shielding plates P1, P2 and P3 are formed of metal, resin and the like, for example. The slits S1, S2 and S3 need not be voids, and may be composed of optically transparent members.

Here, it is difficult for known recording devices to set the position when placing fabrics because fabrics such as the T-shirt F are soft and diverse in form. Consequently, the desired printing position and the actual printed position in the fabric are easily shifted from each other. In particular, the positioning in the front-rear direction tends to be difficult while the positioning in the left-right direction is relatively easy.

Conversely, in the recording device 1, the illumination mechanism 45 emits light from the placing surface 4a in the above-described illumination pattern L. Thus, when placing the T-shirt F on the placing surface 4a, it is easy to set the position with reference to the illumination pattern L.

Returning back to FIG. 1, the colorimeter mechanism 9 and the illuminometer mechanism 10 are disposed to face the placing surface 4a. Specifically, the colorimeter mechanism 9 and the illuminometer mechanism 10 are oriented approximately downward to face the placing surface 4a on a slightly backward side of the opening 8a of exterior member 8.

The colorimeter mechanism 9 measures the color tone of the T-shirt F placed on the placing surface 4a. Specifically, the colorimeter mechanism 9 includes a colorimeter with a color measuring function. The color tone information of the T-shirt F includes L* as brightness and a* and b* as chromaticity representing hue and saturation in the color space of the T-shirt F, for example. In the recording device 1, the color of the illumination pattern L of the illumination mechanism 45 is changed in accordance with the color tone information of the T-shirt F to be measured. The colorimeter provided in the colorimeter mechanism 9 is not limited, and publicly known colorimeters are applicable.

The illuminometer mechanism 10 includes an illuminometer. The illuminometer mechanism 10 measures the illuminance of the placing surface 4a where the T-shirt F is placed. The above-described illuminance is the illuminance of the illumination pattern L transmitted through the T-shirt F, and attenuates in accordance with the fabric type, thickness, and color of the T-shirt F and the like. In the recording device 1, the light quantity of the illumination pattern L of the illumination mechanism 45 is changed in accordance with the above-described illuminance to be measured. The illuminometer provided in the illuminometer mechanism 10 is not limited, and publicly known illuminometers are applicable.

Note that the T-shirt F may be fixed to the tray 4 with a frame-shaped fixing device and the like when placed on the placing surface 4a of the tray 4. Note that the medium on which the printing is performed with the recording device 1 is not limited to the T-shirt F.

Figure 6:
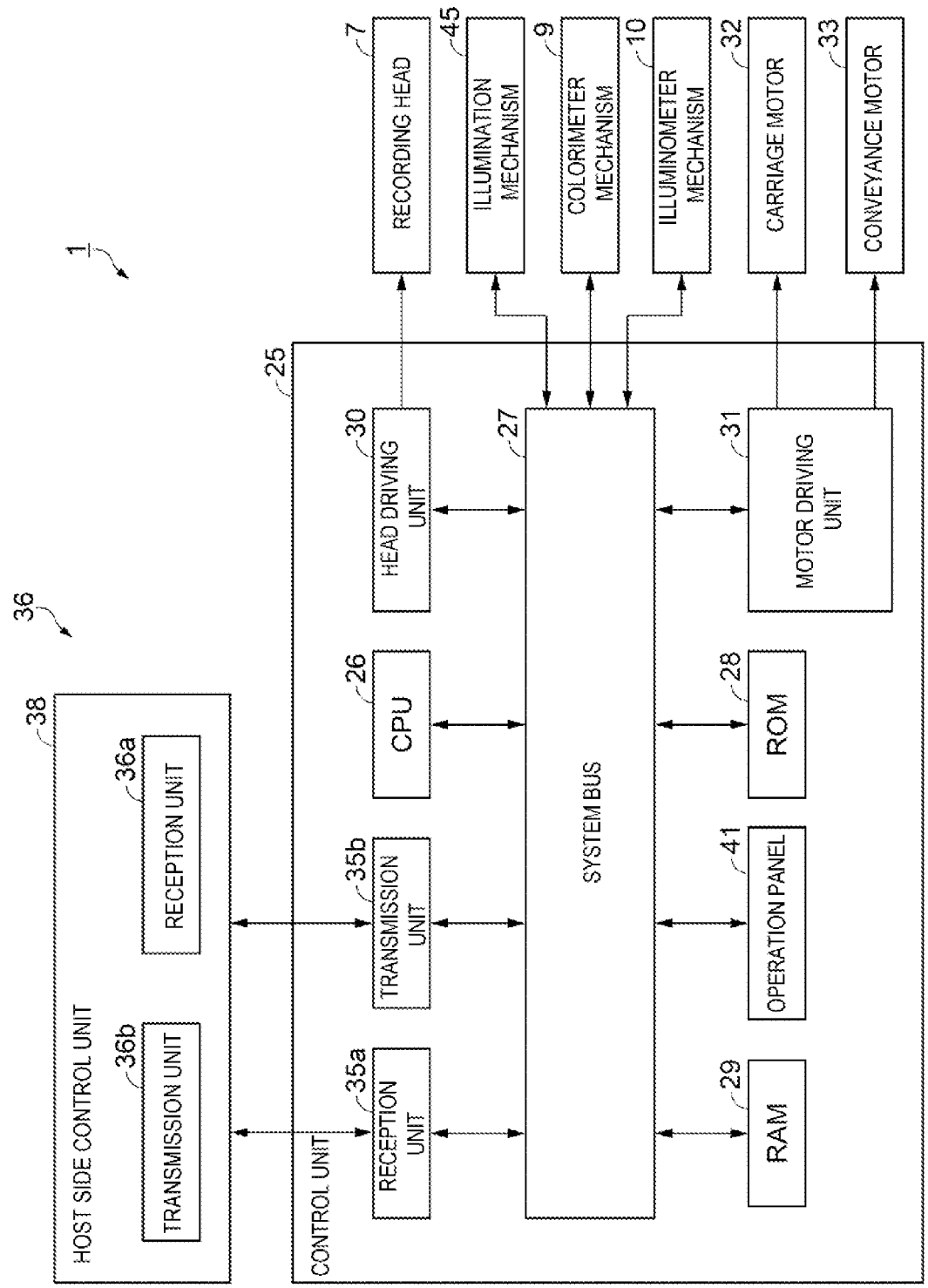
FIG. 6 is a block diagram illustrating a configuration of a recording system.

As illustrated in FIG. 6, the recording system according to this embodiment includes the recording device 1 and a host device 36. The host device 36 is an information terminal such as a personal computer, for example. In FIG. 6, illustration of the components such as a display monitor and a central processing unit (CPU) of the host device 36 is omitted.

The control unit 25 of the recording device 1 is an example of a recording side control unit in the recording system of this embodiment. The control unit 25 includes the reception unit 35a, a transmission unit 35b, a CPU 26, a system bus 27, a read only memory (ROM) 28, a random access memory (RAM) 29, a head driving unit 30, a motor driving unit 31, and the operation panel 41.

The head driving unit 30 is electrically connected to the recording head 7. The motor driving unit 31 is electrically connected to the carriage motor 32 and the conveyance motor 33. The illumination mechanism 45, the colorimeter mechanism 9, and the illuminometer mechanism 10 are electrically connected to the system bus 27.

The CPU 26 manages the entire control of the recording device 1. Through the system bus 27, the CPU 26 is electrically connected to the ROM 28, the RAM 29, the head driving unit 30, the motor driving unit 31, the reception unit 35a, the transmission unit 35b, the illumination mechanism 45, the colorimeter mechanism 9, the illuminometer mechanism 10, and the operation panel 41. The ROM 28 stores various control programs executed by the CPU 26, maintenance sequences and the like. The RAM 29 temporarily stores data.

The head driving unit 30 drives the recording head 7. The motor driving unit 31 drives the carriage motor 32 and the conveyance motor 33. Various instructions input to the operation panel 41 are transmitted to the CPU 26.

The host device 36 includes a host side control unit 38 and a monitor 39 not illustrated in the drawing. The host side control unit 38 includes a host side reception unit 36a and a host side transmission unit 36b. The host device 36 transmits and receives a variety of information such as the operational conditions of the recording device 1 and print data between it and the recording device 1. The reception unit 36a corresponds to the transmission unit 35b, and the transmission unit 36b corresponds to the reception unit 35a. The variety of information may be transmitted and received between the recording device 1 and the host device 36 in either of a wired or wireless manner. In the recording system of this embodiment, the various instructions related to the operation of the recording device 1 may be input also from the host device 36.

The host side control unit 38 of the host device 36 transmits various instructions corresponding to the operation condition and the like by using the transmission unit 36b, and the reception unit 35a of the recording device 1 receives it. The above-described various instructions include illumination instruction information specifying the illumination pattern L. Specifically, for example, the operator of the recording system selects the illumination pattern L1 from the candidates of the illumination pattern L and transmits it from the transmission unit 36b, and, the reception unit 35a receives it. In this manner, the control unit 25 can change the illumination pattern L of the illumination mechanism 45 on the basis of the illumination instruction information received by the reception unit 35a. That is, the control method for the recording device 1 of this embodiment can change the illumination pattern L of the illumination mechanism 45 on the basis of the illumination instruction information received by the reception unit 35a.

The case where illumination pattern L can be changed includes a case where the illumination mechanism 45 includes a liquid crystal panel and the like and it is automatically changed to the illumination pattern L1 when the illumination pattern L1 is selected, and a case where the operator wears the light shielding plate P1 corresponding to the illumination pattern L1 and the illumination pattern L1 is changed by the light shielding plate P1, for example.

The illumination instruction information includes information representing the light quantity of the illumination pattern L emitted by the illumination mechanism 45. The operator can input an instruction of increasing and reducing the above-described light quantity in accordance with the color, type, and thickness of the fabric of the T-shirt F and the like. The control unit 25 can change the light quantity of the illumination pattern L on the basis of the information representing the light quantity.

More specifically, in the case where the T-shirt F is a white fabric, the light quantity is set to a standard value when the fabric is thin, whereas the light quantity is set to a higher value when the fabric is thick, for example. In addition, in the case where the T-shirt F is a fabric with a strong color, the light quantity is set to a slightly higher value when the fabric is thin, whereas the light quantity is set to a higher value when the fabric is thick.

In this manner, the light quantity of the illumination pattern L is changed in accordance with the form of the T-shirt F, and the visibility of the illumination pattern L can be improved. In addition, since the light quantity can be adjusted to an appropriate value, the power consumed by emission of the illumination pattern L can be reduced.

Here, the control unit 25 may automatically change the light quantity of the illumination pattern L in accordance with the illuminance measured by the illuminometer mechanism 10. Specifically, the illuminometer mechanism 10 measures the illuminance of the illumination pattern L emitted and transmitted through the T-shirt F, for example in accordance with an instruction of the operator through the host device 36, or in an automatic manner after the T-shirt F is placed on the placing surface 4a. The control unit 25 increases or reduces the light quantity of the illumination pattern L in accordance with the measured illuminance. In this manner, the light quantity of the illumination pattern L attenuated due to the T-shirt F is regulated, and thus the visibility of the illumination pattern L is further improved. In addition, since the light quantity is automatically adjusted, the convenience of the operator is improved.

The illuminance instruction information includes information representing the color of the illumination pattern L emitted by the illumination mechanism 45. The operator can input an instruction for changing the above-described color in accordance with the color, type, and thickness of the fabric of the T-shirt F and the like. The control unit 25 changes the color of the illumination pattern L on the basis of information representing the color of the illumination pattern L.

More specifically, in the case where the T-shirt F is a white fabric, the color of the illumination pattern L is set to red, for example. In addition, in the case where the T-shirt F is a fabric with a strong color, the color of the illumination pattern L is set to white. In this manner, the color of the illumination pattern L is changed in accordance with the form of the T-shirt F, and thus the visibility of the illumination pattern L can be improved.

The control unit 25 may automatically change the color of the illumination pattern L in accordance with the color tone information measured by the colorimeter mechanism 9. Specifically, the colorimeter mechanism 9 measures the color tone of the T-shirt F in accordance with an instruction of the operator through the host device 36, or in an automatic manner after the T-shirt F is placed on the placing surface 4a, for example. The control unit 25 automatically changes the color of the illumination pattern L in accordance with the measured color tone information. In this manner, the color of the illumination pattern L is changed in accordance with the color of the T-shirt F, and thus the visibility of the illumination pattern L is further improved. In addition, since the color is automatically changed, the convenience of the operator is improved.

The above-described change of the light quantity and color of the illumination pattern L is made as the conditions shown in Table 1, for example. The numerical values of the light quantity column in Table 1 are guide values, not values with units. The setting conditions corresponding to the type of the medium are not limited to Table 1.

TABLE 1

| Medium Type | Set Condition | |
|---|---|---|
| | Color of Illumination Pattern | Light Quantity (Illuminance) |
| White T-Shirt (Thin) | Red | 5 (Standard) |
| White T-Shirt (Thick) | Red | 10 (Strong) |
| Strong Color T-Shirt (Thin) | White | 7 (Slightly Strong) |
| Strong Color T-Shirt (Thick) | White | 10 (Strong) |

In the former case of the above-described two cases where illumination pattern L can be changed, the illumination instruction information includes light emission pattern information corresponding to the illumination pattern L, and the control unit 25 automatically changes the illumination pattern L emitted by the illumination mechanism 45 on the basis of the light emission pattern information. In this manner, in comparison with the case where the light shielding plate P1 is applied to change the illumination pattern L1, the time required for the selecting and mounting the light shielding plate P1 can be saved.

The print data of the recording device 1 is transmitted from the transmission unit 36b of the host device 36 to the reception unit 35a of the recording device 1. When the illumination pattern L corresponding to the slit S1 is selected, the light emission pattern information corresponds to information representing the outer periphery of the printing range included in the print data. The control unit 25 causes the illumination mechanism 45 to emit the illumination pattern L1 representing the outer periphery of the printing range on the basis of the light emission pattern information. In this manner, it is easy to determine the outer periphery of the printing range, making it further easier to set the position when placing the T-shirt F on the placing surface 4a.

In addition, when the illumination pattern L corresponding to the slit S2 is selected, the light emission pattern information corresponds to information representing the center position of the printing range included in the print data. The control unit 25 causes the illumination mechanism 45 to emit the illumination pattern L representing the center position of the printing range on the basis of the light emission pattern information.

When the illumination pattern L corresponding to the slit S3 is selected, the light emission pattern information corresponds to information representing any corner position at the outer periphery of the printing range included in the print data. The control unit 25 causes the illumination mechanism 45 to emit the illumination pattern L representing any corner position of the outer periphery of the printing range on the basis of the light emission pattern information. In the above-described manner, the center position or any corner position of the outer periphery of the printing range is easily determined, making it further easier to set the position when placing the T-shirt F on the placing surface 4a.

In addition, the configuration of selecting the illumination pattern using the slit is not limitative, the external shape of the pattern D itself included in the print data may be emitted as the illumination pattern L1. Since the print data itself is emitted, the printing position is easily determined, and the position is easily set when placing the T-shirt F on the placing surface 4a.

In the latter case of the above-described two cases where illumination pattern L can be changed, the illumination instruction information includes information specifying the light shielding plate P1, and the control unit 25 makes a notification of the information specifying the light shielding plate P1 to the operator by using the display function of the operation panel 41. In this manner, the operator can easily select the light shielding plate P1, and thus the convenience of the operator is improved. Note that while the illumination pattern L1 is applied in the above-described example, the illumination pattern L is not limited to this.

The illumination instruction information may be input through the operation panel.

A procedure of placing the T-shirt F on the placing surface 4a is described in detail below. First, print data is created at the host device 36. Specifically, with an application such as raster image processor (RIP) software, data of patterns, images, texts, designs and the like as print data are created.

Figure 7:
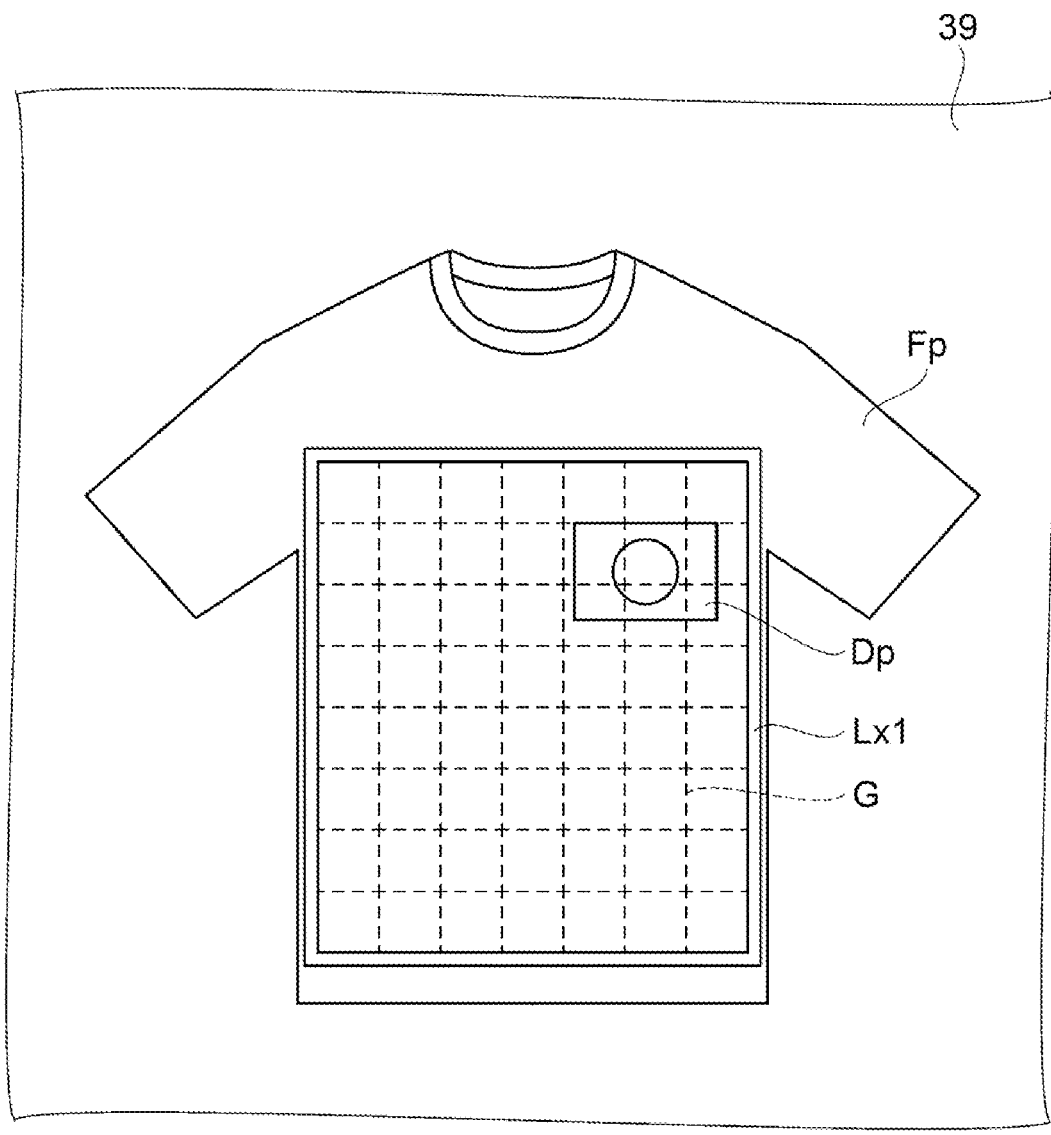
FIG. 7 is a schematic view illustrating a print data creation screen in a host device.

More specifically, as illustrated in FIG. 7, the arrangement and size of a pattern model Dp and the like are considered with a guide of a grid G of a T-shirt model Fp with reference to the display of the monitor 39 of the host device 36. The pattern model Dp corresponds to the pattern D to be printed on the T-shirt F.

In addition, the illumination pattern L to be applied is selected. In FIG. 7, light emission pattern L×1 corresponding to the above-described light shielding plate P1 is selected. Light emission pattern L×1 represents the outer periphery of the printing range in the T-shirt model Fp. The position of the pattern model Dp in the created print data becomes the desired printing position of the pattern D.

Figure 8:
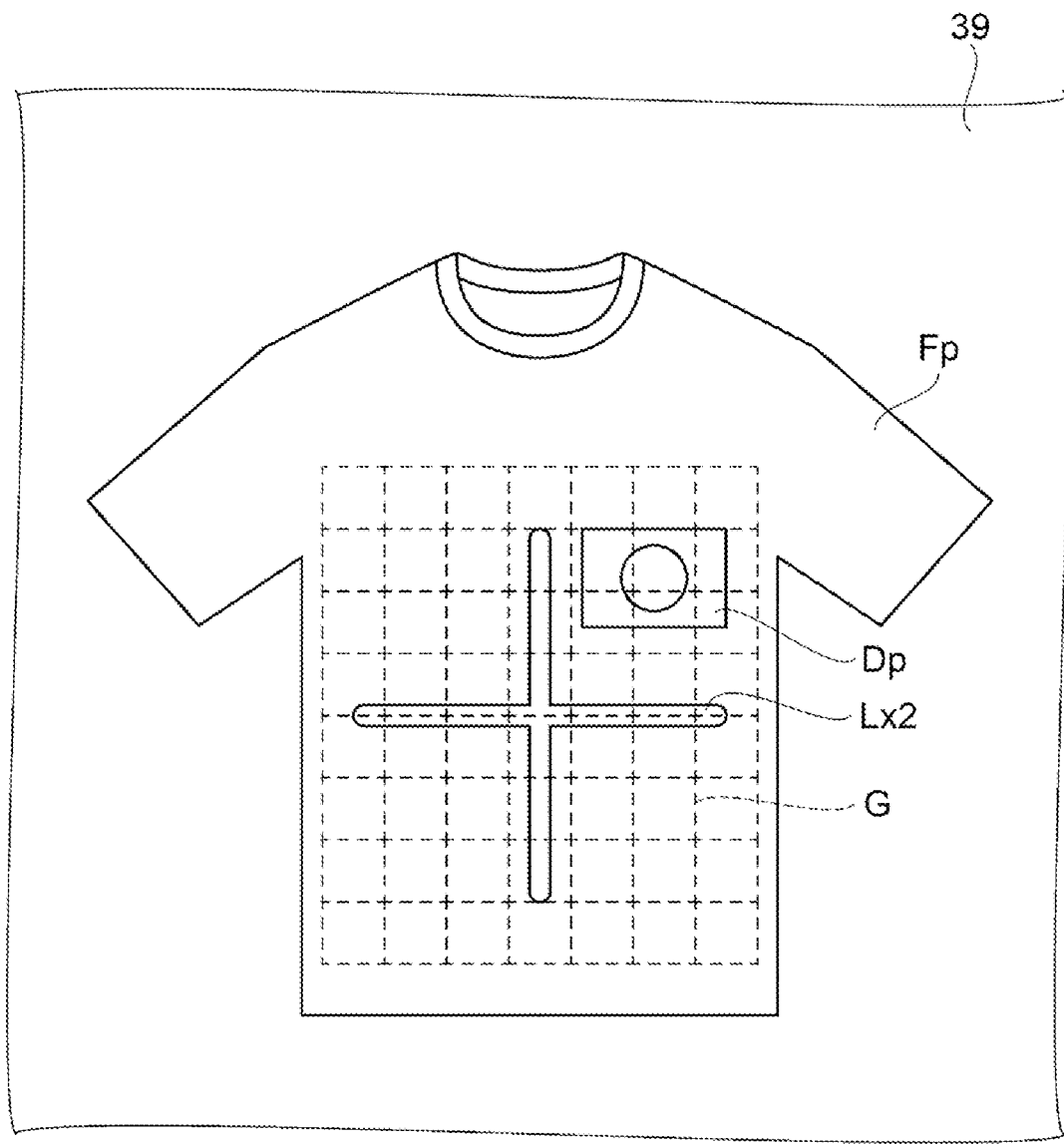
FIG. 8 is a schematic view illustrating a print data creation screen in the host device.
Figure 9:
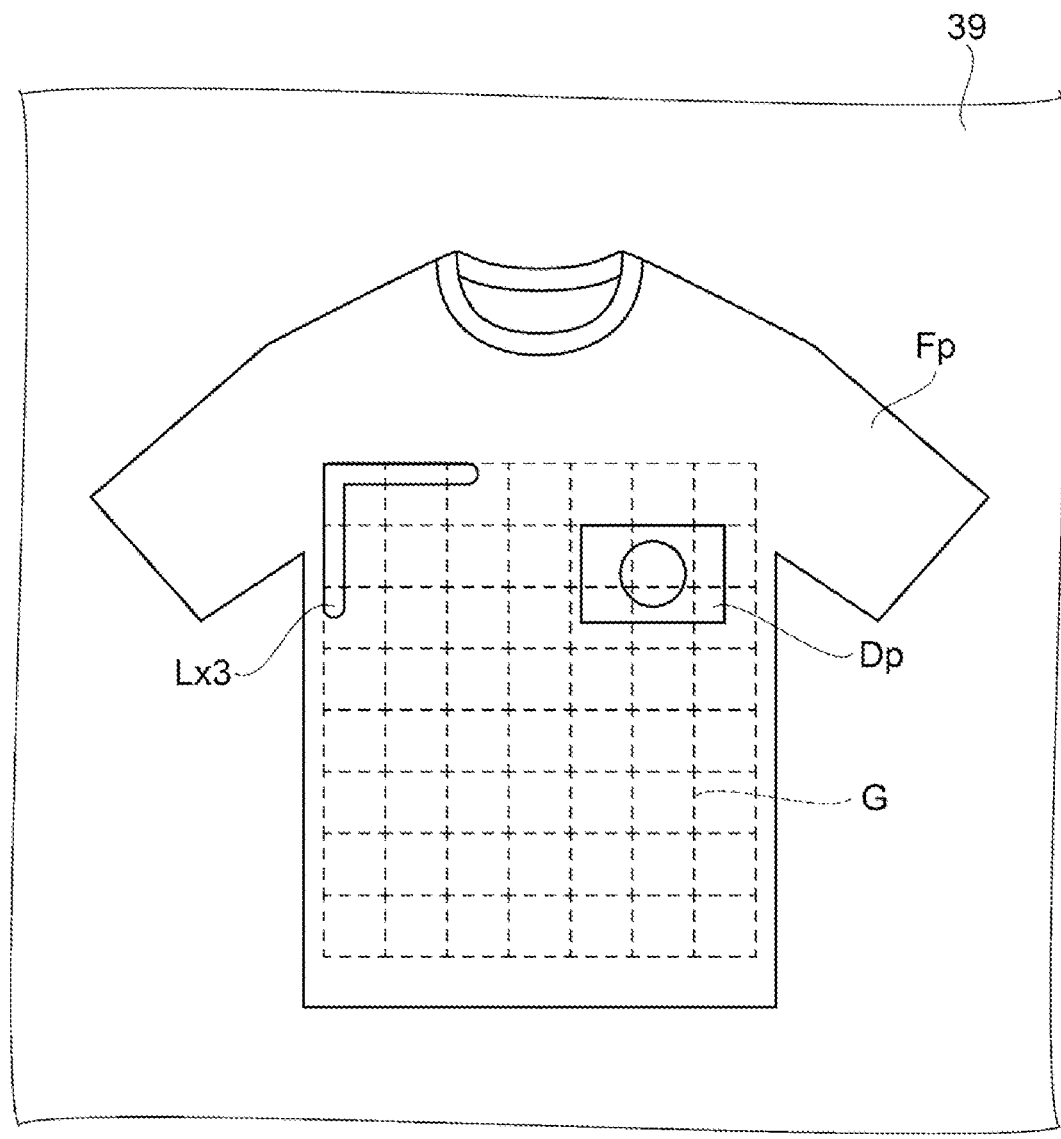
FIG. 9 is a schematic view illustrating a print data creation screen in a host device.

In the case where the illumination pattern L corresponding to the above-described slit S2 is used, light emission pattern L×2 is selected as illustrated in FIG. 8. In addition, in the case where the illumination pattern L corresponding to the above-described slit S3 is used, light emission pattern L×3 is selected as illustrated in FIG. 9.

Figure 10:
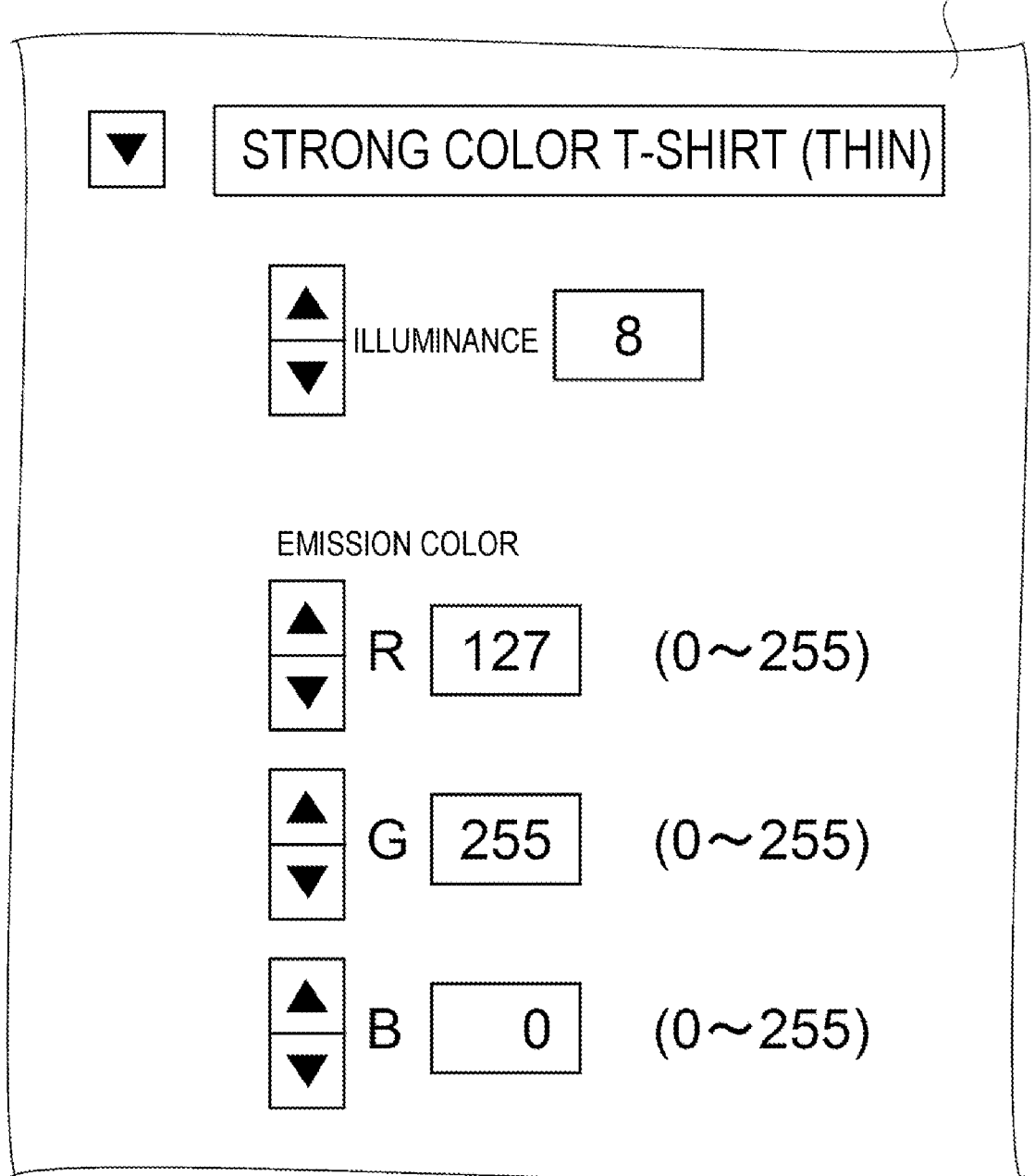
FIG. 10 is a schematic view illustrating a setting screen of illumination instruction information in the host device.

Further, as illustrated in FIG. 10, the illumination instruction information may be specified on an application of the host device 36. Specifically, when the fabric of the T-shirt F is selected, recommended illuminances and emission colors for the illumination pattern L are presented. The operator may slightly modify the presented recommend conditions, and may specify the illuminance and emission color of the illumination pattern L on the above-described application.

The illumination instruction information is included in the print data. The created print data is transmitted from the transmission unit 36b of the host device 36 to the reception unit 35a of the control unit 25 of the recording device 1. Note that as described above, the illumination instruction information may be configured to be specified by being displayed on the operation panel 41 of the recording device 1. In this configuration, the illumination instruction information may not be included in the print data.

Figure 11:
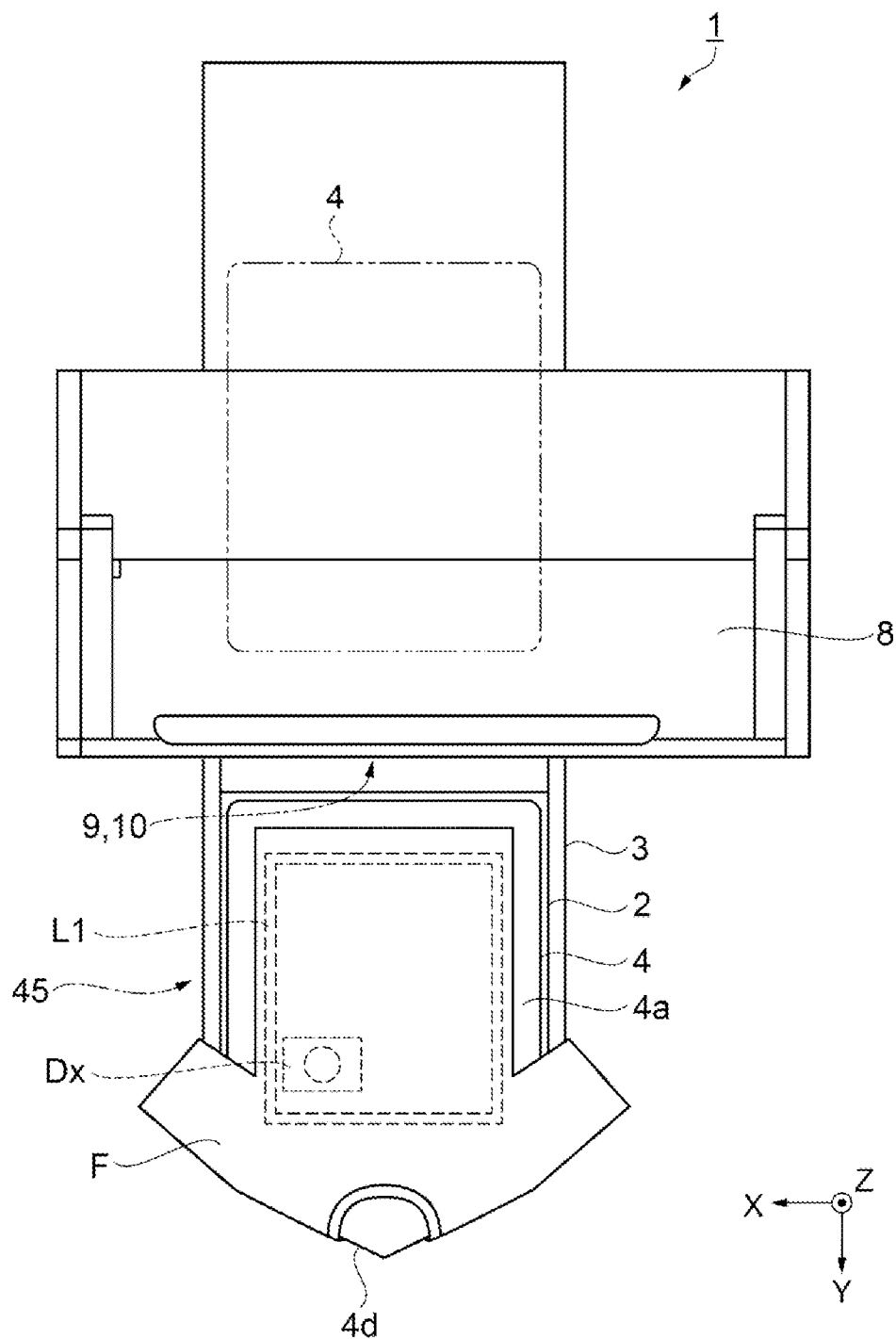
FIG. 11 is a schematic plan view illustrating an arrangement of an illumination pattern of the recording device.

Next, the T-shirt F is placed on the tray 4 of the recording device 1. Specifically, as illustrated in FIG. 11, the T-shirt F is placed in the state where the medium support unit 2 and the tray 4 are moved to the most forward position with respect to the recording device 1. The tray 4 and the medium support unit 2 can be retracted to the position indicated with the chain double-dashed line at the execution of the printing. Note that illustration of the operation panel 41 is omitted in FIG. 11 for the sake of convenience of illustration.

In the case where the light shielding plate P1 is used, the light shielding plate P1 is mounted to the tray 4 before the T-shirt F is placed. Then, by making an instruction at the operation panel 41, the illumination mechanism 45 is caused to irradiate the placing surface 4a with light in the illumination pattern L1.

The tray 4 includes a hanger part 4d. The hanger part 4d is provided to protrude forward from the placing surface 4a of the tray 4. The T-shirt F is placed while the hanger part 4d is inserted to the T-shirt F. The position where the T-shirt F is placed is a position where the portion corresponding to the neck to shoulders of the T-shirt F hits the hanger part 4d.

The T-shirt F is placed on the placing surface 4a with reference to the illumination pattern L1. At this time, the positioning may be performed with reference to the screen illustrated in FIG. 7 of an application of the host device 36. In addition, after the T-shirt F is temporarily placed on the placing surface 4a, the tray 4 may be moved rearward to measure the color of the T-shirt F by using the colorimeter mechanism 9 and measure the illuminance of the placing surface 4a by using the illuminometer mechanism 10. As described above, the results of the measurements may be transmitted to the control unit 25 for the purpose of the adjustment of the illumination pattern L1.

The measurement results of the colorimeter mechanism 9 and the illuminometer mechanism 10 may be transmitted from the transmission unit 35b of the recording device 1 to the reception unit 36a of the host device 36. Then, the host device 36 may store the information related to the T-shirt F including the above-described measurement results, in the RAM of the host side control unit 38. In addition, the above-described information may be stored in the RAM 29 of the recording device 1. In this manner, in the case where printing is repeatedly performed on the same T-shirt F, the conditions related to the illumination pattern L1 need not be selected and adjusted each time, and thus the convenience of the operator is improved.

Next, when the position of a scheduled printing pattern Dx matches the desired printing position, printing is performed. The operator makes an instruction of execution of printing from the operation panel 41 or the printer driver of the host device 36. In this manner, the pattern D is printed on the T-shirt F. After the completion of the printing, the tray 4 moves to and stops at the most forward position, and thus the T-shirt F can be removed from the tray 4.

According to this embodiment, the following effects can be obtained. A medium such as the T-shirt F can be placed at an appropriate position with a simple configuration. Specifically, the medium can be placed at an appropriate position where the medium should be placed with reference to the illumination pattern L emitted on the placing surface 4a. In addition, since the appropriate position is clearly indicated without using a projecting mechanism such as a projector, the configuration is less complicated. It is thus possible to provide the recording device 1, the control method for the recording device 1, and the recording system that can place the medium such as the T-shirt F at an appropriate position with a simple configuration.

What is claimed is:

1. A recording device comprising:
a recording unit configured to perform recording on a medium;
a placing part including a placing surface for placement of the medium, the placing part being configured to move in a front-rear direction including a position facing the recording unit;
an illumination mechanism disposed at the placing part and configured to emit light from a light source provided inside the placing part in an illumination pattern toward the placing surface;
an input unit configured to receive illumination instruction information specifying the illumination pattern; and
a control unit, wherein
the control unit is configured to change the illumination pattern of the illumination mechanism, based on the illumination instruction information received by the input unit,
the illumination mechanism includes a plurality of light shielding plates corresponding to the illumination pattern, and
the illumination instruction information includes information specifying the light shielding plate; and the control unit makes a notification of the information specifying the light shielding plate.

2. The recording device according to claim 1, wherein the illumination instruction information includes light emission pattern information corresponding to the illumination pattern; and the control unit changes the illumination pattern emitted by the illumination mechanism, based on the light emission pattern information.

3. The recording device according to claim 2, wherein the light emission pattern information corresponds to information representing an outer periphery of a printing range included in print data, a center position of the printing range, or any corner position of an outer periphery of the printing range; and
the control unit causes the illumination mechanism to emit the illumination pattern indicating at least one of the outer periphery of the printing range, the center position of the printing range or any corner position of the outer periphery of the printing range, based on the light emission pattern information.

4. The recording device according to claim 2, wherein the light emission pattern information corresponds to information representing an external shape of a pattern included in print data; and the control unit causes the illumination mechanism to emit the illumination pattern indicating the external shape of the pattern, based on the light emission pattern information.

5. The recording device according to claim 1, wherein the illumination instruction information includes information representing a color of the illumination pattern emitted by the illumination mechanism; and
the control unit changes the color of the illumination pattern, based on the information representing the color of the illumination pattern.

6. The recording device according to claim 1, further comprising a colorimeter mechanism configured to measure a color tone of the medium, wherein the control unit automatically changes a color of the illumination pattern in accordance with measured color tone information.

7. The recording device according to claim 1, wherein the illumination instruction information includes information representing a light quantity of the illumination pattern emitted by the illumination mechanism; and
the control unit changes the light quantity of the illumination pattern, based on the information representing the light quantity.

8. The recording device according to claim 1, further comprising an illuminometer mechanism configured to measure an illuminance of the placing surface on which the medium is placed, wherein the control unit automatically changes a light quantity of the illumination pattern in accordance with the illuminance measured.

9. A control method for a recording device, the recording device comprising:
a recording unit configured to perform recording on a medium;
a placing part including a placing surface for placement of the medium, the placing part being configured to move in a front-rear direction including a position facing the recording unit;
an illumination mechanism disposed at the placing part and configured to emit light from a light source provided inside the placing part in an illumination pattern toward the placing surface; and
an input unit configured to receive illumination instruction information specifying the illumination pattern, wherein
the illumination pattern of the illumination mechanism is configured to be changed based on the illumination instruction information received by the input unit,
the illumination mechanism includes a plurality of light shielding plates corresponding to the illumination pattern, and
the illumination instruction information includes information specifying the light shielding plate; and the control unit makes a notification of the information specifying the light shielding plate.

10. A recording system comprising:
a recording device;
a host device;
a recording unit configured to perform recording on a medium;
a placing part including a placing surface for placement of the medium, the placing part being configured to move in a front-rear direction including a position facing the recording unit;
an illumination mechanism disposed at the placing part and configured to emit light from a light source provided inside the placing part in an illumination pattern toward the placing surface; and
a reception unit configured to receive an illumination instruction information specifying the illumination pattern from the host device; and
a recording side control unit,
wherein the host device includes:
a transmission unit, and
a host side control unit, the host side control unit transmits the illumination instruction information to the recording device by using the transmission unit, and
the illumination pattern of the illumination mechanism is configured to be changed by the recording side control unit, based on the illumination instruction information received by the reception unit,
the illumination mechanism includes a plurality of light shielding plates corresponding to the illumination pattern, and
the illumination instruction information includes information specifying the light shielding plate; and the control unit makes a notification of the information specifying the light shielding plate.

11. The recording system according to claim 10, wherein the host device stores information related to the medium.

* * * * *